BUILT-IN ANTENNA SYSTEM

Filed June 17, 1950 4 Sheets-Sheet 1

INVENTOR.
KURT ENSLEIN
BY J. L. Bowes
ATTORNEY

Oct. 4, 1955 K. ENSLEIN 2,719,919

BUILT-IN ANTENNA SYSTEM

Filed June 17, 1950 4 Sheets-Sheet 2

INVENTOR.
KURT ENSLEIN
BY T. L. Bowes
ATTORNEY

BUILT-IN ANTENNA SYSTEM

Filed June 17, 1950 4 Sheets-Sheet 3

INVENTOR.
KURT ENSLEIN
BY T. L. Bowes
ATTORNEY

INVENTOR.
KURT ENSLEIN
BY T. L. Bowes
ATTORNEY

United States Patent Office 2,719,919

Patented Oct. 4, 1955

2,719,919

BUILT-IN ANTENNA SYSTEM

Kurt Enslein, Rochester, N. Y., assignor to Stromberg-Carlson Company, a corporation of New York Application June 17, 1950, Serial No. 168,724

4 Claims. (Cl. 250—33)

The present invention relates to electromagnetic wave antennas, and, more particularly, to antennas which are completely contained within the cabinet of a modulated carrier wave receiver and which are adapted to receive transmitted signals over a wide band of frequencies.

Under the present standards, television channels are divided between two bands, the low frequency band extending from 54 to 88 megacycles, and the high frequency band extending from 174 to 216 megacycles. With television stations distributed over such a wide band of frequencies, it is difficult to obtain an antenna system which may be contained within the cabinet of the television receiver and yet will satisfactorily receive stations transmitting in both the high and low frequency bands. Conventionally, in the reception of television signals, the use of an outdoor antenna, which is an additional expense to the customer both in initial cost and installation, is considered imperative in many localities having relatively weak television signals.

While indoor antennas for television receivers have been developed and are in use, they have not been entirely satisfactory because of their inability to provide from a relatively weak transmitting signal a signal output sufficient to operate conventional receivers. Hence, these antennas have been generally considered as acceptable only in areas where the receivers are relatively close to the transmitting stations. To provide increased range, certain of these prior arrangements have utilized a narrow band antenna system employing a variable tuning element which is connected to the receiving antenna proper by a length of transmission line, the tuning element being varied to tune the antenna to a particular station. In such arrangements, tuning of the antenna is necessary in addition to tuning of the receiver to obtain the desired picture and sound. When it is realized that some localities may have a number of different television stations, any one of which may be tuned in several times during an evening, the inconvenience of having to tune the antenna of the television receiver whenever the station is changed may be readily appreciated. Accordingly, it is an important object of the present invention to provide a new and improved television antenna system capable of receiving signals from all presently existing television stations.

It is another object of the present invention to provide a new and improved built-in antenna system which is particularly suitable for use in the reception of signals from television stations without adjustments of the antenna when selecting stations in either the high or low frequency bands.

It is a further object of the present invention to provide a new and improved built-in television antenna system having substantially increased signal output for signals collected in both the high and low frequency television bands.

It is a still further object of the present invention to provide a new and improved built-in television antenna system in which the receiving elements may be readily rotated by the operator so as to provide optimum reception of a particular received station.

The invention, both as to its organization and method of operation, together with further objects and advantages thereof, will best be understood by reference to the following specification taken in connection with the accompanying drawings, in which.

Figure 1:
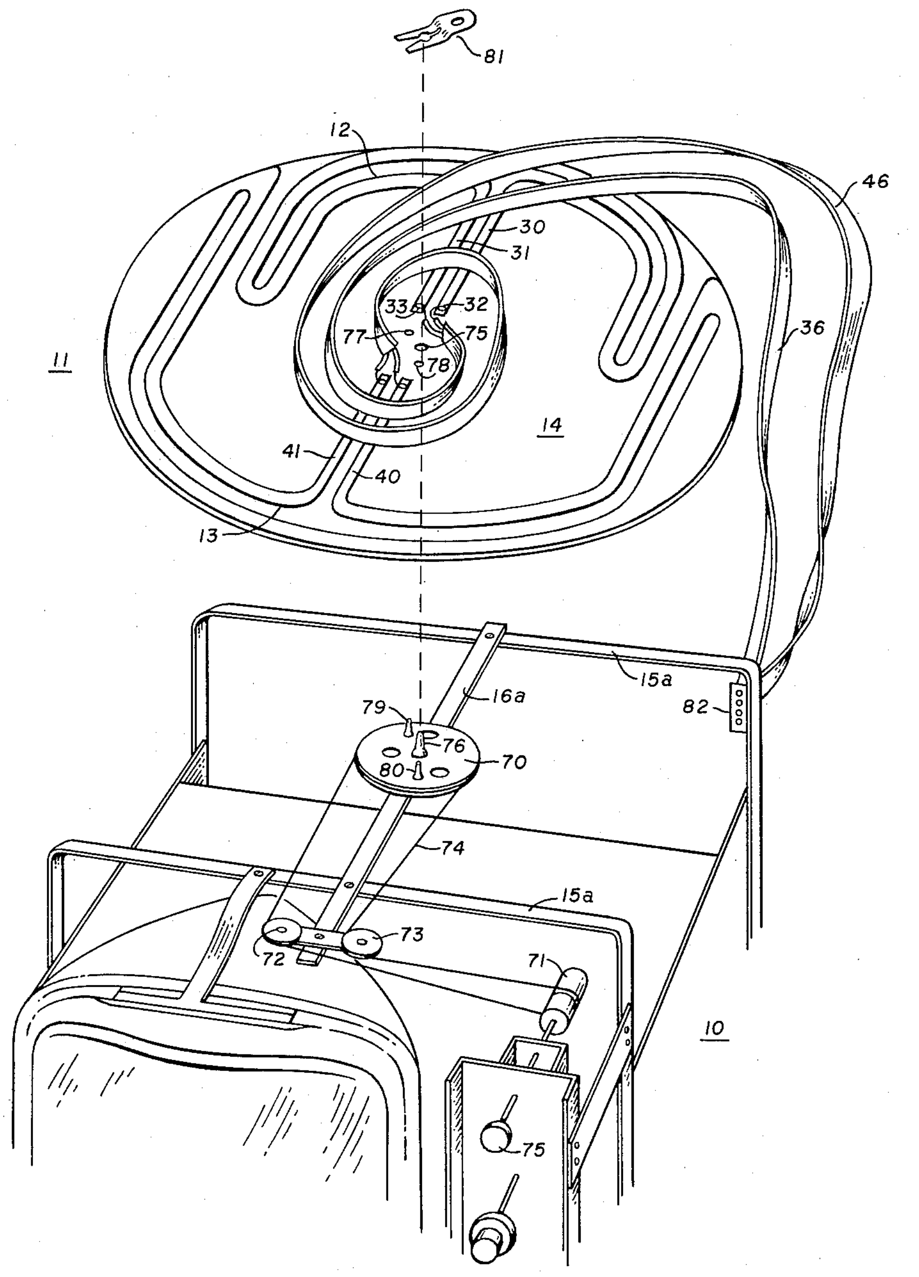
Fig. 1 is a perspective fragmentary view of a television receiver chassis and built-in antenna system constructed in accordance with the principles of the present invention.
Figure 2:
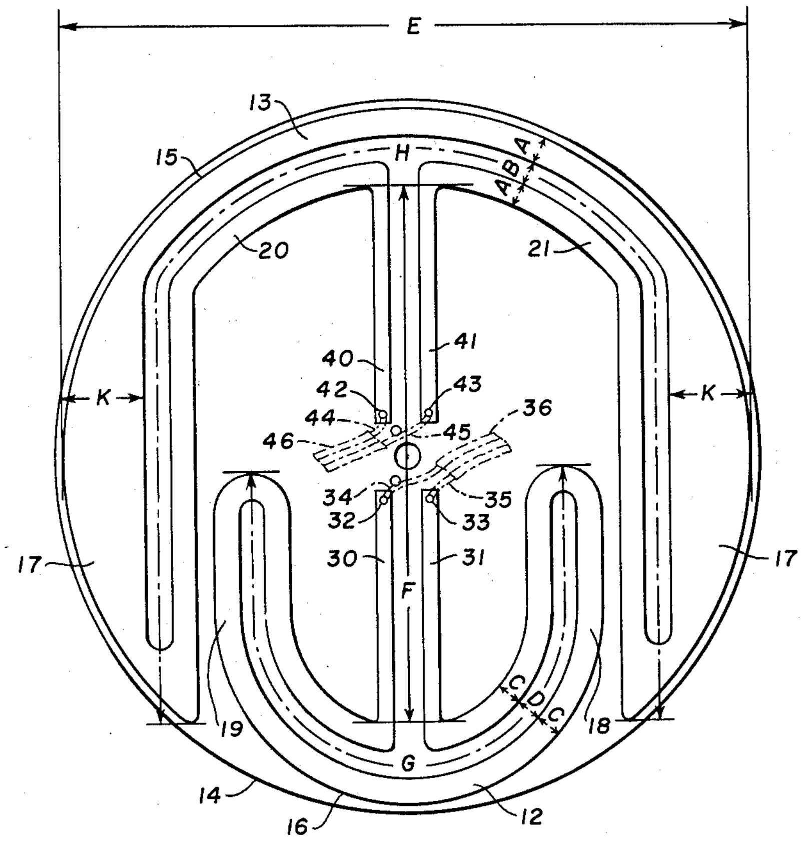
Fig. 2 is a plan view, on a larger scale, of the antenna system of Fig. 1.

Referring now more particularly to the drawings, one embodiment of the built-in television antenna of the present invention is illustrated in Figs. 1 and 2, wherein the antenna system is adapted to be positioned within the cabinet housing a television receiver chassis 10, the cabinet not being shown in the drawing. The built-in television antenna 11 is preferably positioned above the chassis 10 and beneath the top wall of the cabinet and comprises a first folded dipole element indicated generally at 12 and a second folded dipole element indicated generally at 13. The folded dipole elements 12 and 13 are of generally U-shaped configuration and are shown in the form of conductive strips, or ribbons, which are positioned upon the top surface of a supporting disk 14 of suitable insulating material. The supporting disk 14 is preferably positioned above and rotatably supported from chassis 10 by means of suitable supports **15*a* and crosspiece or member 16*a* suitably secured to supports 15*a*** as described hereinafter.

The dimensions of the ribbon-like U-shaped dipole element 12, including the length G thereof, are preferably chosen that the element 12 is resonant within the high frequency band of television stations, and preferably at approximately the center frequency of that band, i. e., at a frequency of approximately 195 megacycles. Also, the dimensions of the ribbon-like U-shaped dipole elements 13, including the length H thereof, are so chosen that the element 13 is resonant within the low frequency band of television stations. Preferably the element 13 is resonant near the low end of the low frequency band of television stations, although satisfactory results are obtained for resonance at any part of the band.

In order to minimize the space occupied by the antenna array of the present invention, and, to the end that the array may be readily rotated within the cabinet of a television receiver, the folded dipole element 13 is shaped so as to conform generally to the periphery of the supporting disk 14 and folded dipole element 12 is shaped to fit within the opening defined by element 13. Thus, the outer edge 15 of the low frequency element 13 is circular and conforms to the periphery of the disk 14 throughout substantially the length thereof. Also the base portion 16 of the U-shaped element 12 conforms generally to the adjacent arcuate edge of the supporting disk 14.

In order that the dipole elements 12 and 13 may be utilized to receive stations over a relatively wide band of frequencies, without the provision of auxiliary tuning elements which must be adjusted to tune the antenna to each particular station within a given frequency band, the elements 12 and 13 are shown in the form of conductive ribbons of substantial width as compared to the length thereof so as to provide antenna elements having exceedingly broad band characteristics which are suitable for receiving signals from the entire low or high frequency band of television stations. Additionally, the width and spacing of the individual conductors of the dipole elements are so chosen that the elements substantially match a conventional 300 ohm transmission line. Thus, the width A of the conductors of the folded dipole element 13 are preferably made equal to the spacing B therebetween. Likewise, the width C of the conductors of the folded dipole element 12 are preferably made equal to the spacing D therebetween.

In addition to providing an antenna array having extremely broad band characteristics, the use of strip type antenna elements substantially reduces reflections and capacity pickup effects in the plane of the array. Thus, with the supporting disk in a horizontal plane, reflections and capacity effects due to objects near the receiver, such as, for example, persons viewing the receiver, are substantially reduced. The reduction of such body effects will be readily apparent when it is realized that the array presents an extremely narrow profile to objects positioned around the receiver.

To increase the electrical length of the dipole elements 12 and 13 so that these elements, which are preferably a half wavelength in electrical length, may be of considerably shorter length physically and to provide a compact antenna array which will fit within the cabinet of a conventional television receiver, the outer conductor of the element 13 is provided with end portions 17 which are of substantially increased width and provide increased loading upon the end portions of the element 13. Also, the U-shaped element 12 is positioned within the open end of the U-shaped element 13 with the arms 18 and 19 of the element 12 in closely spaced parallel relation to the end portions of the element 13. With this arrangement, the element 12 provides additional capacitive loading for the element 13 due to the proximity thereto of the arm portions 18 and 19 of the element 12. Also, as stated above, the relatively wide end portions 17 of the element 13 also contribute capacitive loading so that the element 13 may be of substantially shorter physical length although it is resonant within the low frequency band of television stations.

The ribbon-like folded dipole elements 12 and 13 may be constructed by any suitable means, such as, for example, by punching or stamping the elements from sheet stock. Alternatively, the elements may be deposited on the insulated disk 14 by any suitable transfer method. The elements 12 and 13 are a conductive material, such as aluminum, for example, and if stamped or punched, they are cemented or otherwise secured to the supporting disk 14. In order to protect the elements 12 and 13 from injury during rotation of the disk 14, the elements 12 and 13 are preferably positioned on the top surface of the disk in the space between the disk 14 and the undersurface of the top wall of the cabinet. With this arrangement, the elements 12 and 13 are completely protected although the array may be readily rotated as a unit by means hereinafter described.

As previously indicated, antenna disk 14 is shown as being rotatably carried on arm or support **16*a*. For this purpose, member 70 is pivotally carried by member 16*a* in any suitable manner. If the antenna is to be rotatable, member 70 may be a pulley, as illustrated in Fig. 1 and a suitable drive system may be associated therewith. For example, pulleys 71, 72 and 73 and string or wire 74 may be operatively connected with a suitable knob 75 disposed at the front of chassis 10. Disk 14 may be positively located on pulley 70 by means of a central opening 75 positioned to receive stud 76 and offset openings 77 and 78 arranged to receive locating pins 79 and 80 respectively. Suitable fastening means may be employed such as the bifurcated spring clip 81** shown in Fig. 1.

While the antenna assembly described above may be readily rotated by means of the operating knob 75, it will be appreciated that any other suitable means may be used to rotate the antenna assembly. Thus, for example, the disk may be positioned so that the edge thereof protrudes through a slot in a wall of the cabinet, the disk then being rotated by manually engaging the projecting portion thereof. If such an arrangement is utilized, it can be readily appreciated that the diameter of the disk 14 may be made substantially greater than the outer diameter of the element 13 so that the elements 12 and 13 do not project through the side wall of the cabinet but remain hidden from view therein.

To connect the dipole elements 12 and 13 to the input circuit of the television receiver, the ribbon-like elements 12 and 13 are provided with terminal portions to which electrical connection may be made. Thus, the element 12 is provided with terminal portions 30 and 31, the end portions of which are provided with eyelets 32 and 33 which extend through the supporting disk 14 and are electrically connected to the terminal portions 30 and 31. The terminal portions are adapted to receive a transmission line section which is used to connect the element 12 to the input circuit of the receiver. Thus, conductors 34 and 35 of the transmission line section 36 are connected respectively to the terminal portions 30 and 31 of the dipole element 12. In a similar manner, the dipole element 13 is provided with terminal portions 40 and 41 in the end portions of which are positioned eyelets 42 and 43. The conductors 44 and 45 of a second transmission line section 46 are connected respectively to the terminal portions 40 and 41 of the element 13. Transmission lines 36 and 46 terminate at a suitable terminal block 82. The length of transmission lines 36 and 46 in the arrangement of Figs. 1 and 2 should be an even number of quarter wave lengths at about the center of each band. If terminal block 82 is mounted near the tuner, as on bracket **15*a*, much shorter lines 36 and 46** may be used (in the latter case not greater than one-eighth of a wave length long).

Figure 3:
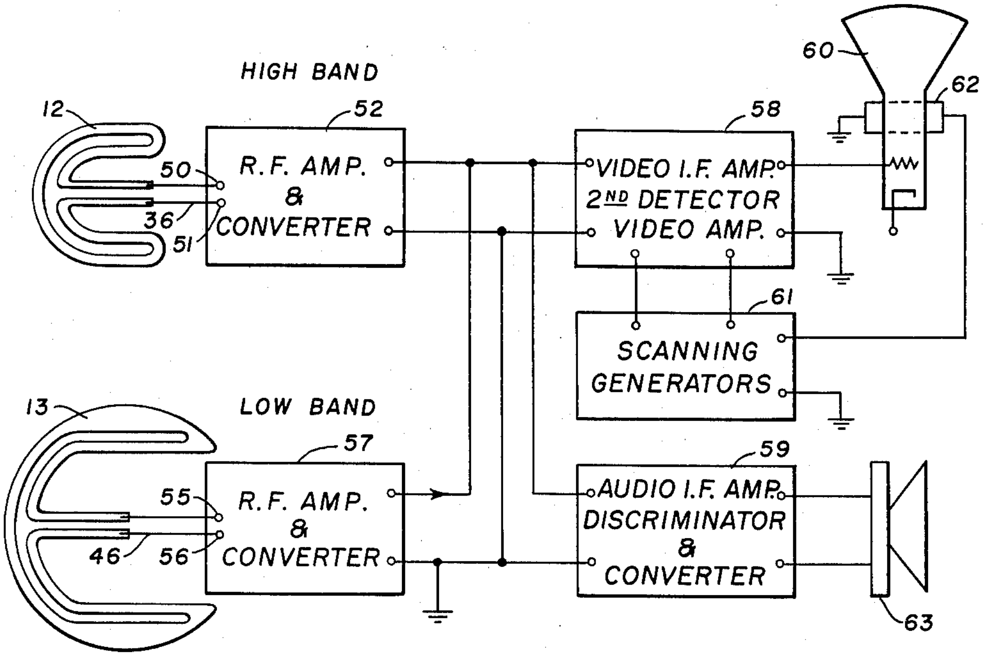
Figs. 3 and 4 are schematic diagrams illustrating alternative connections of the antenna system of Fig. 1 to the electrical circuits of the receiver.

To utilize the signals intercepted by the antenna elements 12 and 13 of the above-described built-in television antenna, a television receiver such as that diagrammatically illustrated in Fig. 3 may be employed. As there shown, the antenna element 12, which is resonant at approximately the center frequency of the high frequency band of television stations, is connected through the transmission line 36 to the input terminals 50, 51 of a radio frequency amplifier and converter 52 which is adapted selectively to receive, amplify and convert to a suitable intermediate frequency signals having frequencies within the high frequency band of television stations. The folded dipole element 13, which is resonant within the low frequency band of television stations, is connected through the transmission line section 46 to the input terminals 55, 56 of a second radio frequency amplifier and converter 57 which is arranged selectively to receive, amplify and convert to a suitable intermediate frequency signals having frequencies within the low frequency television band.

The output of the amplifier and converter units 52 and 57 are commonly connected to a video channel indicated in block diagram form at 58 and an audio channel indicated in block diagram form at 59. The video channel 58 may comprise a video I. F. amplifier, a second detector and video amplifier, the output of the video amplifier being connected to the control electrode of a cathode ray reproducing device 60. Synchronizing signals from the video channel 58 are supplied to horizontal and vertical scanning generators indicated in block diagram form at 61, the output of the scanning generators 61 being connected to suitable scanning coils 62 which surround the neck of the cathode ray tube. The audio channel 59 may comprise an audio I. F. amplifier, a frequency discriminator, and an audio output amplifier, the output of the audio channel 59 being connected to a second reproducing device 63.

The units 52 and 57 through 63, inclusive, may all be of conventional well-known construction and a detailed illustration and description thereof is considered unnecessary herein. However, briefly discussing the operation of the above-described receiving system as a whole, signals from television stations within the high frequency band are intercepted by the folded dipole element 12 and are impressed through the transmission line 36 upon the input circuit of the radio frequency amplifier and converter 52 wherein they are selectively amplified and converted to intermediate frequency signals. Video signals of intermediate frequency are selectively amplified in the channel 58 and are supplied to the second detector wherein they are detected and from which they are supplied through the video amplifier to the control electrode of the cathode ray tube 60 so as to control the brilliance of the cathode ray beam in accordance with the transmitted image. Synchronizing signals, which have been separated from the video signals, are supplied to the horizontal and vertical scanning generators 61, the scanning currents produced in the coils 62 causing deflection of the electron beam in two mutually perpendicular directions thereby to reconstruct the transmitted image. Audio intermediate frequency signals are further supplied to the audio channel 59 wherein they are selectively amplified and supplied through the frequency discriminator and audio output amplifier to the sound reproducing device 63.

In a like manner, signals transmitted from television stations within the low frequency band are intercepted by the folded dipole element 13, and are selectively amplified in the unit 57 and converted to the corresponding video and audio I. F. frequencies. The audio and video I. F. signals are then supplied to the channels 58 and 59 in the manner described in connection with the radio frequency amplifier and converter unit 52.

With the arrangement described above, signals may be received on either the antenna element 12 or the antenna element 13, and may be selectively amplified and converted to the appropriate intermediate frequencies without interference from extraneous signals received on the unused dipole element. In this connection it will be understood that the amplifier and converter units 52 and 57 are selectively energized in accordance with the particular desired television station from which signals are being received. Thus, the amplifier and converter unit 52 is energized when the station selector switch of the receiver (not shown) is actuated to the switch positions corresponding to the high frequency channels numbered 7 through 13, and the unit 52 is de-energized for reception on channels 2 through 6. Likewise, the amplifier and converter unit 57 is energized when the station selector switch is in the positions corresponding to channels 2 through 6 and is de-energized in switch positions corresponding to channels 7 through 13. With this arrangement the simultaneous transmission to the receiver input circuits of signals from antenna elements 12 and 13 is prevented.

In accordance with an important feature of the present invention, the dipole elements 12 and 13 are spaced apart by an amount sufficient to cause the low frequency dipole 13 to act as a reflector for the high frequency dipole 12 during reception of stations in the high frequency band. Thus, referring to Fig. 2, the midsections of the folded dipole elements 12 and 13 are spaced apart by a distance F which is so chosen that the intermediate portions 20 and 21 of the dipole element 13 act as a parasitic reflector for the high frequency dipole element 12 and the gain of the antenna system for high frequency stations is substantially increased. With the low frequency element 13 acting as a reflector during reception from high frequency stations, the directivity of the antenna system is increased so that multiple reflected signals, commonly known as "ghosts," are discriminated against and hence do not appear to as great a degree in the television picture. Also, by providing a built-in antenna system which may be readily rotated, reception of such undesired signals may be further reduced.

Figure 4:
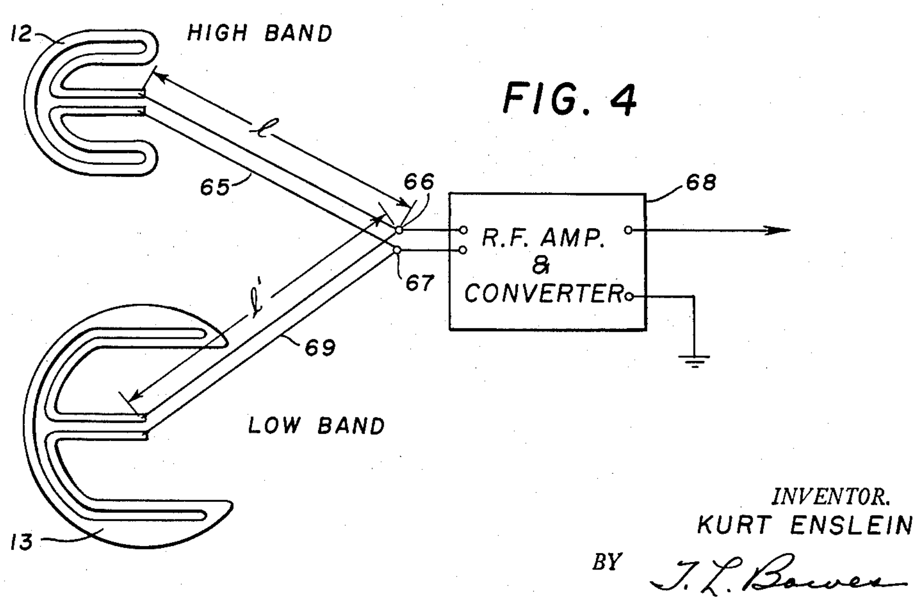

In the event that the television receiver is provided with a single radio frequency amplifier and converter unit adapted selectively to receive television stations in both high and low frequency bands, connection to the folded dipole elements of the antenna array may be made as illustrated in Fig. 4. Thus, referring to this figure, the high frequency dipole element 12 is connected through a transmission line section 65 to the input terminals 66 and 67 of the single radio frequency amplifier and converter unit 68 of the television receiver. The low frequency dipole element 13 is also connected through a transmission line section 69 to the input terminals 66 and 67.

In order to prevent interaction between the antenna elements 12 and 13, other than the operation of the element 13 as a reflector for the element 12 as described above, there is provided means for isolating the elements 12 and 13 from the common load impedance presented across the input terminals 66 and 67. In the illustrated embodiment, the above-described isolation is provided by choosing the transmission line section 65 with a length $l$ which is equal to a quarter wavelength at the resonant frequency of the low frequency dipole element 13. Likewise, the transmission line section 69 is chosen with a length $l'$ which is equal to a quarter wavelength at the resonant frequency of the dipole element 12. With this arrangement, the antenna elements 12 and 13 are effectively short-circuited by means of the quarter wavelength transmission lines associated therewith for the operating frequencies of the other dipole element. Thus, the element 12 is effectively short-circuited when the element 13 is intercepting signals in the low frequency band and the element 13 is effectively short-circuited when the element 12 is receiving signals in the high frequency band. In this connection it will be understood that signals from the single R. F. amplifier and converter unit 68 of Fig. 4 are supplied to the video and audio channels of the television received in the manner similar to that discussed in connection with the complete receiver of Fig. 3. While a television receiver employing separate intermediate frequency channels for video and sound signals has been shown in Fig. 3, it is evident that the present invention may equally well be employed in television receivers having a single intermediate frequency channel for both video and sound signals.

Figure 5:
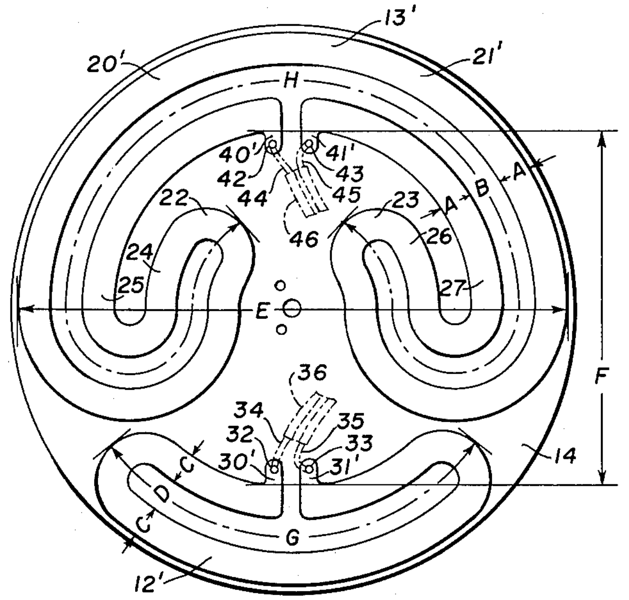
Figs. 5 and 6 are plan views of alternative embodiments of the antenna system of the present invention.

In the event that a built-in antenna system of even smaller overall dimensions is required, the alternative embodiment of the present invention shown in Fig. 5 may be employed. The low frequency dipole element 13' and high frequency dipole element 12' of the antenna array of Fig. 5 are positioned on a supporting disk 14 in a manner similar to the array of Fig. 2. Likewise, elements 12' and 13' are in the form of conductive ribbons of substantial width as compared to the length thereof so as to provide broad band characteristics for each antenna element. However, in order to provide an extremely compact antenna array, the end portions 22 and 23 of the folded dipole element 13' are folded back upon the intermediate portions 20' and 21' of the element 13'. Also, in order to maintain the spacing between the arms of the folded dipole element 13' substantially uniform, the folded end portions 22 and 23 of the element are arranged in spaced parallel relationship to the intermediate portions 20' and 21' of the element. Thus, the end portion 24 of the inner conductor of the element 13 is arranged in spaced parallel relation to the adjacent portion 25 of the conductor. Likewise, the end portion 26 is positioned parallel to the adjacent portion 27 of the element 13. The elements 12' and 13' of the alternative embodiment in Fig. 5 are provided with terminal portions 30', 31', 40' and 41' in a manner similar to that discussed with the embodiment of Fig. 2.

The high frequency dipole element 12' of Fig. 5 is shaped so as to conform to the periphery of the supporting disk 14 and the dimensions of the element 12', including the length G thereof, are so chosen that the element 12′ is resonant within the high frequency band of television stations. Likewise, the dimensions of the re-entrant dipole element 13′, including the length H thereof, are so chosen that the element 13′ is resonant within the low frequency band of television stations. In this connection, it is evident that the intermediate portions 20′ and 21′ of the element 13′ are spaced from the element 12′ so as to act as a parasitic reflector during reception of signals from stations within the high frequency band, in a manner similar to that discussed in connection with Fig. 2. With this arrangement, the physical length H of the dipole element 13′ which is conventionally equal to a half wavelength at the operating frequency, may be substantially less than a half wavelength with the consequent reduction in space occupied by the element. This reduction is in addition to the space saved by folding back the end portions of the element.

Figure 6:
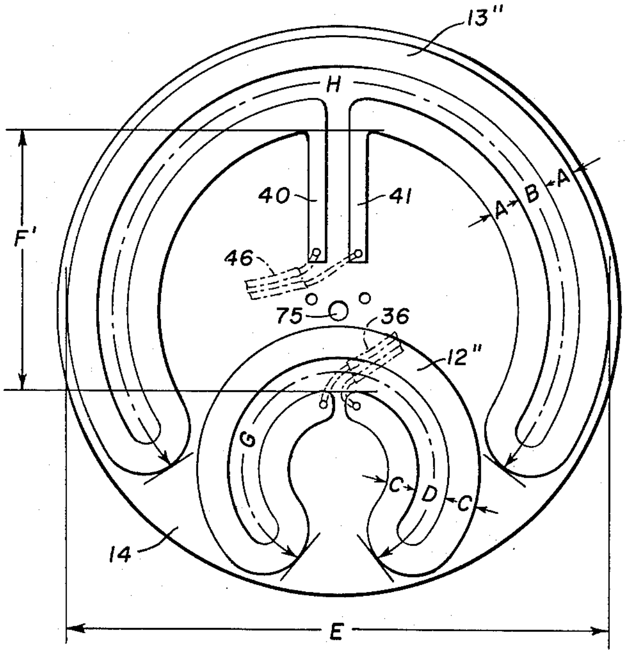

In Fig. 6 there is shown still another embodiment of my invention. Folded dipole element 13″ is similar to dipole element 13 of Fig. 1 except that the enlarged end portions 17 are omitted and the element approaches a circular cross-sectional configuration and conforms closely to the periphery of the supporting disk 14.

The folded dipole element 12″ of Fig. 6 is also generally circular in cross-sectional configuration and the open end faces in the same direction as the open end of element 13″. With this arrangement, the direction of arrival for a given directional signal is the same for each dipole element. With this arrangement, transmission line 30—31 of Fig. 2 is unnecessary. Dimension F′ is preferably equal to a quarter of a wavelength at the center frequency of the band to be covered.

While the antenna system of the present invention is preferably positioned in a horizontal plane so as to obtain the advantages of directivity and reduced susceptibility to reflected signals, it is obvious that the antenna system may, if desired, be otherwise positioned, as in a vertical plane. For example, the antenna system may be positioned on the back wall of the cabinet or on an upstanding panel at the back of the receiver.

From the foregoing description, it will be apparent that antenna systems characterized by the features of the present invention may be utilized to receive transmitted signals over an extremely wide band of frequencies. By way of illustration, and not in any sense as a limitation to the particular physical values thereof, an antenna array constructed in accordance with the present invention has been found satisfactory to receive television signals within the presently existing television bands; namely, a low frequency band from 54 to 88 megacycles and a high frequency band from 174 to 216 megacycles, and to supply signals within these bands to a 300 ohm input circuit in the receiver. Thus, in the specific embodiment shown in Fig. 2, the width of the ribbon-like dipole elements 12 and 13 is three-quarters of an inch and the spacing therebetween also three-quarters of an inch. The spacing F between the terminal portions of elements 12 and 13 is 16½ inches and the overall diameter E of the array is 21 inches. The length G of the dipole element 12 is 24 inches, the length H of the element 13 is 44 inches, and the width K of the enlarged end portions of the element 13 is 2½ inches. Also, in the specific alternative embodiment of Fig. 5, the width of the dipole elements 12 and 13 is one inch and the space therebetween also one inch; the spacing F between the dipole elements 12 and 13 is 11 inches and the overall diameter E of the array 17 inches. The length G of the dipole element is 13 inches and the length H of the dipole element 13 is 40 inches. With antenna systems of the above-described configurations, television stations in both the low and high frequency band have been received with substantial increase in gain compared to presently existing built-in antennas. Antennas embodying the principles of my invention are equally applicable to other than television signals as, for example, the reception of signals in the U. H. F. region.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. A built-in antenna system for receiving signals from television transmitting stations and the like operating at frequencies within relatively low and high frequency bands comprising, a first folded dipole antenna element resonant within said low frequency band and having a pair of output terminals associated therewith, the intermediate portions of the first element extending away from said terminals in a semicircular arc, the end portions of said first element being folded back upon said intermediate portions and conforming to the arc thereof, and a second folded dipole antenna element resonant at substantially the center of said high frequency band and having a pair of output terminals spaced opposite the output terminals of said first dipole element, said second element having a radius of curvature equal to that of the intermediate portions of said first dipole element, said pairs of output terminals being spaced apart so that said first dipole element acts as a parasitic reflector for said second dipole element during reception of signals from stations within said high frequency band.

2. A built-in antenna system as set forth in claim 1 wherein said elements are mounted on a common support.

3. A built-in antenna system as set forth in claim 2 wherein portions of said elements are disposed in overlapping relationship.

4. A built-in antenna system as set forth in claim 2 wherein remote curved portions of said elements lie substantially on the perimeter of a circle.

References Cited in the file of this patent

UNITED STATES PATENTS

| | | |
|---|---|---|
| 1,745,342 | Yagi | Jan. 28, 1930 |
| 1,933,941 | Taylor | Nov. 7, 1933 |
| 2,110,159 | Landon | Mar. 8, 1938 |
| 2,281,429 | Goddard | Apr. 28, 1942 |
| 2,412,249 | Brown | Dec. 10, 1946 |
| 2,474,480 | Kearse | June 28, 1949 |
| 2,511,574 | Finneburgh et al. | June 13, 1950 |
| 2,514,992 | Edelsohn | July 11, 1950 |
| 2,551,664 | Galper | May 8, 1951 |
| 2,565,661 | Lidz | Aug. 28, 1951 |

FOREIGN PATENTS

| | | |
|---|---|---|
| 892,360 | France | Jan. 4, 1944 |

OTHER REFERENCES

Electronics, January 1950, pages 72, 73 and 74.